Dec. 2, 1958     G. W. JACKSON     2,862,725
AIR SUSPENSION SYSTEM WITH TWO STAGE PRESSURE SYSTEM
Filed June 18, 1956     2 Sheets-Sheet 1

INVENTOR.
GEORGE W. JACKSON
BY
HIS ATTORNEY

Dec. 2, 1958    G. W. JACKSON    2,862,725
AIR SUSPENSION SYSTEM WITH TWO STAGE PRESSURE SYSTEM
Filed June 18, 1956    2 Sheets-Sheet 2
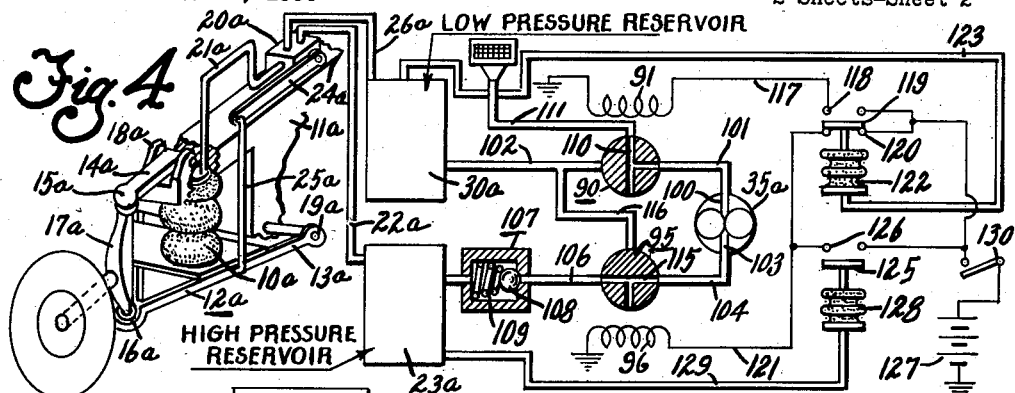
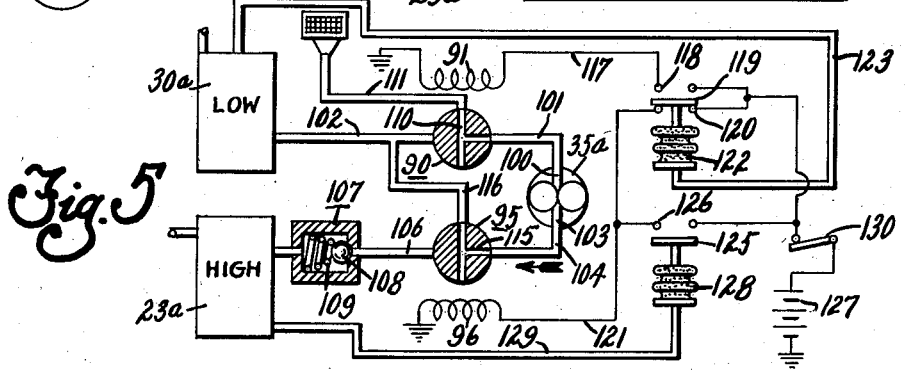
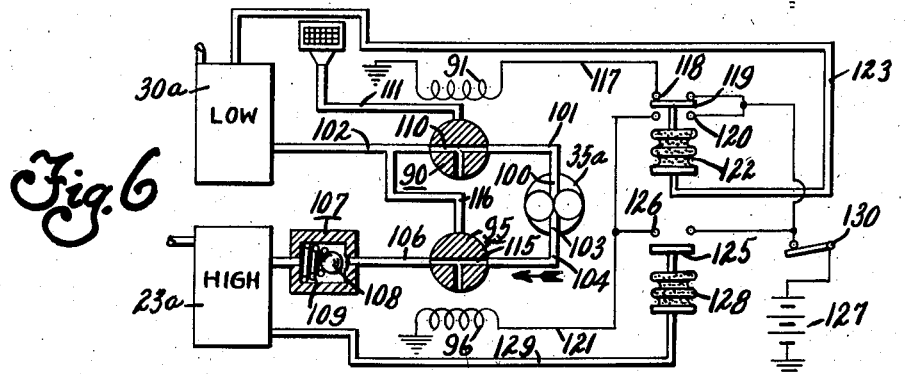
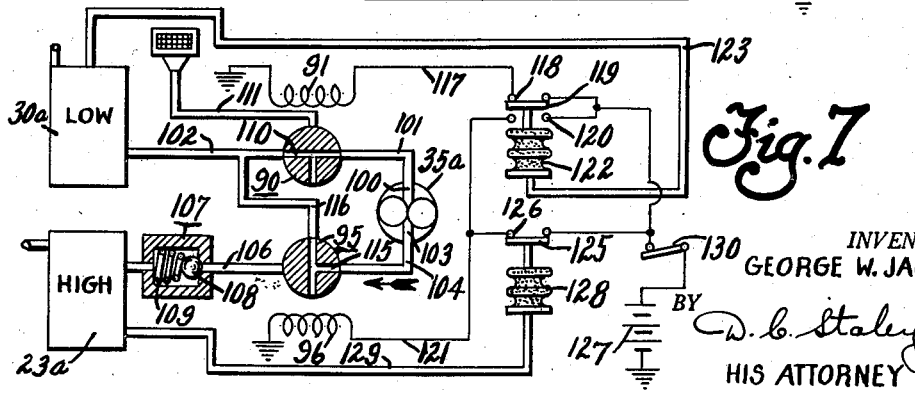
INVENTOR.
GEORGE W. JACKSON
BY
HIS ATTORNEY United States Patent Office 2,862,725
Patented Dec. 2, 1958

2,862,725

AIR SUSPENSION SYSTEM WITH TWO STAGE PRESSURE SYSTEM

George W. Jackson, Dayton, Ohio, assignor to General Motors Corporation, Detroit, Mich., a corporation of Delaware Application June 18, 1956, Serial No. 592,151

14 Claims. (Cl. 280—124)

This invention relates to an air suspension system for a motor vehicle of the type wherein an air spring of an expansible bellows type is positioned between the running gear and chassis of the vehicle, the air spring supporting the sprung mass, that is the chassis, upon the unsprung mass, the running gear. In systems of this type controls are provided to supply air to the air spring in response to an increase of load in the vehicle to maintain a predetermined clearance height between the sprung mass and the unsprung mass. Conversely, when a load in the vehicle is decreased, the controls provide for exhaust of air from the air spring to allow the sprung mass to settle to the predetermined clearance height between the sprung mass and the unsprung mass. Thus the control is adapted to maintain a predetermined clearance height irrespective of load conditions in the vehicle.

In air suspension systems of the type just referred to, air under pressure delivered from a source of high pressure to the control means and the air exhausted from the air spring may be returned to a low pressure reservoir so that air utilized by the control means for effecting a height correction between the sprung mass and the unsprung mass of the vehicle can be conserved.

In this invention therefore the high pressure reservoir is provided for delivery of air to the control means for the air spring and a low pressure reservoir is provided to receive air that is exhausted from the air spring.

It is an object of the invention to provide a single pump in a dual pressure system for maintaining both pressures at relatively constant but different levels and to provide for delivery of air from the low pressure reservoir to the high pressure reservoir, the low pressure reservoir being supplied with air by the pump from atmosphere.

It is another object of the invention to provide a control system for shifting the delivery of air under pressure from a pump automatically between a high pressure reservoir and a low pressure reservoir in a manner that the high pressure reservoir receives its air from the low pressure reservoir so long as the low pressure reservoir is above a predetermined pressure value, but when the pressure in the low pressure reservoir falls below the predetermined value, the delivery of the pump will be shifted from the high pressure reservoir to the low pressure reservoir with the pump receiving air from atmosphere for delivery to the low pressure reservoir.

It is another object of the invention to provide a control system in accordance with the foregoing object wherein the transfer of discharge of air from the pump between the reservoirs is effected by a valve automatically responsive to the pressures in the reservoirs, or to provide electrically actuated valves that are actuated in response to pressures in the reservoirs to shift the discharge of the fluid from the pump between the reservoirs.

Further objects and advantages of the present invention will be apparent from the following description, reference being had to the accompanying drawings wherein a preferred form of the invention is clearly shown.

In the drawings:

Figure 1 is a schematic illustration of an air suspension system for a motor vehicle including a dual pressure system having a valve to regulate pressures both in the low pressure reservoir and the high pressure reservoir of the system, the valve being illustrated in its first position providing for connection of the inlet side of the pump with atmosphere and the discharge side of the pump with the low pressure reservoir.

Figure 4 is a schematic view of a dual pressure system similar to that of Figure 1 but wherein the control valves for shifting the discharge of fluid between the low pressure and the high pressure reservoirs are actuated electrically, the valves being shown in a deenergized position.

Figure 5 is a schematic view similar to Figure 4 with the flow control valves for the pump positioned for connecting the intake of the pump with atmosphere and the discharge of the pump with the low pressure reservoir.

Figure 6 is a schematic view similar to Fig. 1 with the flow control valves in position to connect the intake of the pump with the low pressure reservoir and the discharge of the pump with the high pressure reservoir.

Figure 1:
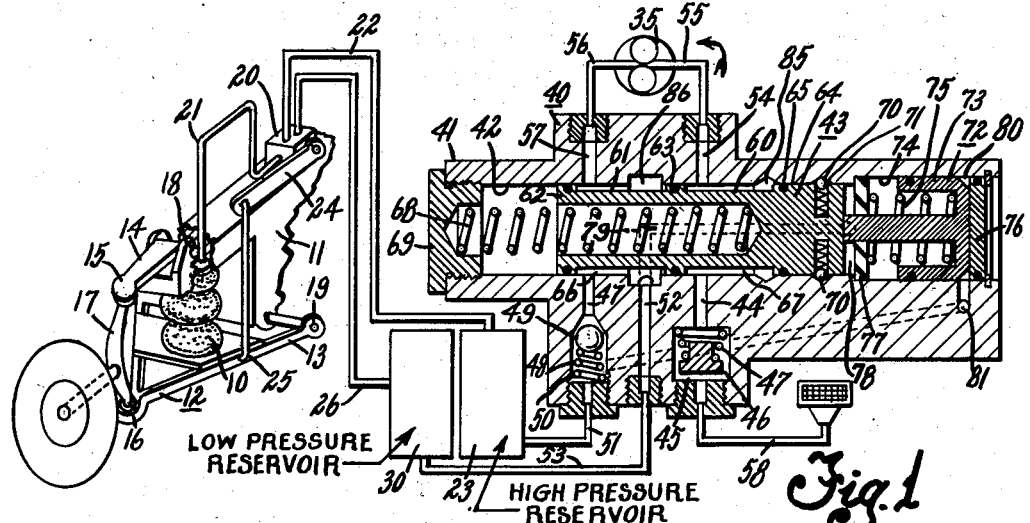

Figure 7 is a schematic view similar to Fig. 1 with the flow control valves positioned for connection of the intake side of the pump with the discharge side of the pump to bypass the reservoirs, In this invention an air spring 10 of an expansible bellows type is placed between the chassis frame 11 or sprung mass of a vehicle and the wheel assembly 12, which is the unsprung mass. The wheel assembly diagrammatically illustrated in Fig. 1 represents a front end axle assembly of a vehicle that includes a lower control arm 13 and an upper control arm 14 connected through spherical joints 15 and 16 with a steering knuckle 17. The upper and lower control arms are pivotally connected to the chassis frame 11 by means of the pivot connections 18 and 19. Thus the air spring 10 supports the chassis frame 11 relative to the wheel assembly, and specifically to the lower control arm 13.

With a predetermined pressure of air within the expansible bellows 10, the sprung mass 11 is maintained at a predetermined clearance height relative to the unsprung mass 12, to establish a predetermined position of the chassis relative to the wheel assembly when the vehicle is in a static condition and no load is in the vehicle.

To provide for maintaining the predetermined clearance height between the sprung mass and the unsprung mass relatively constant, a control valve 20 is carried on the chassis frame 11. The control valve 20 is connected with the air spring 10 through a conduit 21 that provides for delivery of air under pressure into the air spring or exhaust of air therefrom.

Fluid under pressure, preferably air, is delivered to the control valve 20 through a conduit 22 from a high pressure reservoir 23. An inlet valve element is provided in the control valve 20 that is operated by vertical movement of the actuating arm 24 connected with the lower control arm 13 by means or a link 25. When the chassis 11 of the vehicle moves downwardly, representing an increase in load in the vehicle, the arm 24 moves upwardly and opens the inlet valve in the control valve 20 to allow air under pressure to be delivered into the air spring 10 and effect a correction of height clearance.

The control valve 20 is also connected with a low pressure reservoir 30 through a conduit 26, when the load within a vehicle lightens, the sprung mass 11 tends to move upwardly relative to the unsprung mass 12 thereby effecting downward movement of the actuating arm 24 which opens a valve element in the control valve 20 to allow for exhaust of air from the air spring 10 back into the low pressure reservoir 30. Thus by supply and exhaust of air to and from the air spring 10, the sprung mass of the vehicle is maintained at a relatively constant clearance height relative to the unsprung mass.

A fluid pump 35 is provided to supply air under pressure to both the low pressure reservoir 30 and the high pressure reservoir 23, the pump 35 being connected with the reservoirs through a flow control valve 40 that regulates the connection of the discharge of the pump 35 with either the low pressure or high pressure rservoir depending upon the prressure conditions within the reservoirs. The valve 40 also provides for bypassing of the reservoirs when both are up to their predetermined pressure value so that the pump will thereafter operate under a no load condition.

The control valve 40 consists of a valve body 41 that has a cylindrical bore 42 that receives a shiftable valve member 43. The bore 42 is connected to atmosphere by means of a passage 44 through a check valve chamber 45 in which there is placed a check valve 46 spring urged upon its seat by the spring 47, the chamber 45 being connected with atmosphere by means of the conduit 58.

The bore 42 is also connected with the high pressure reservoir 23 through a passage 47 that connects with a check valve chamber 48 that has a check valve 49 retained on its seat by a spring 50. A conduit 51 connects the check valve chamber 48 with the high pressure reservoir 23. The bore 42 is also connected with the low pressure reservoir by means of a passage 52 and a conduit 53.

A passage 54 connects the bore 42 with the inlet side of the pump 35 by means of a conduit 55 and the discharge side of the pump 35 is connected by a conduit 56 with the passage 57 that connects with the bore 42.

The valve element 43 has annular recesses 60 and 61 that are separated by lands 62, 63 and 64 each receiving an O ring 65 to prevent leakage of air from the chambers 66 and 67 formed by the recesses 61 and 60 respectively. A compression spring 68 is placed between the end wall 69 of the bore 42 and the valve element 43 normally to retain the valve element in the position illustrated in Fig. 1 with the detent balls 70 disposed in the annular detent recess 71.

When the valve element 43 is in the position illustrated in Fig. 1, the right hand end of the valve element engages a movable stop member 72 that has a piston head 73 slidable in the cylinder bore 74, the stop member being normally retained in the position illustrated in Fig. 1 by the compression spring 75. A wall member 76 closes the end of the cylinder chamber 74. A divider wall 77 separates the cylinder chamber 74 from the cylinder bore 42 to prevent transfer of fluid between the respective cylinder chambers. The space 78 between the right hand end of the valve element 43 and the divider wall 77 is connected with the passage 52 by means of the passage 79 that in turn connects with the low pressure reservoir 30 so that this space 78 is always exposed to the pressure exhausting in the low pressure reservoir 30. The space 80 between the right hand end of the piston 73 and the closure wall 76 is connected with the check valve chamber 48 through the passage 81 so that this space is always exposed to the pressure of the air within the high pressure chamber 23.

The operation of the valve 40 to maintain predetermined pressure values within the low pressure and high pressure reservoirs is as follows. Assuming both low pressure reservoir 30 and high pressure reservoir 23 to be at zero pressure, the valve element 43 of the valve 40 will be in the position illustrated in Fig. 1 wherein the intake side of the pump 35 is connected with atmosphere through the conduit 55, passage 54, chamber 67, passage 44, chamber 45 and atmosphere line 58. The discharge side of the pump 35 will be connected with the low pressure reservoir 30 through the line 56, passage 57, chamber 66, passage 52 and conduit 53. At this same time, incidentally, the high pressure chamber 23, which now is at zero pressure, will also be connected with the discharge side of the pump from the chamber 66, passage 47, check valve chamber 48 and conduit 51. With the pump 35 operating, the pump being driven by a suitable device such as an electric motor driven from the battery of the motor vehicle or driven from the engine, air will be discharged from the pump into the chamber 66 for delivery concurrently to the low pressure tank 30 and the high pressure tank 23 whereby the pressures in these tanks rise concurrently.

Figure 2:
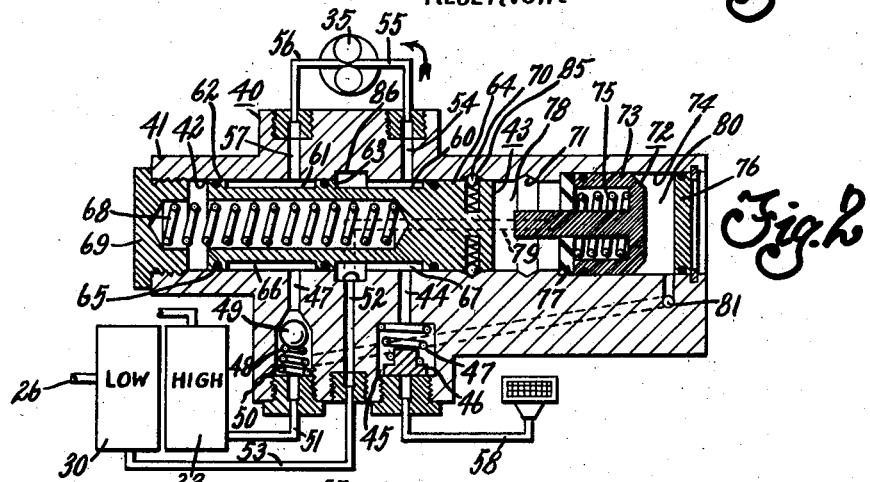
Figure 2 is a schematic view of the valve of Fig. 1 illustrating the same in its second position for connection of the intake of the pump with the low pressure reservoir and the discharge of the pump with the high pressure reservoir.

As the pressures in the tanks 30 and 23 rise, pressure in the space 78 and in the space 80 rises at the same rate so that when the pressure in the low pressure tank 30 reaches a predetermined value, the pressure existing in the space 78 will effect a shifting of the valve element 43 in a left hand direction against the compression of the spring 68 until the detent balls 70 rest in the annular detent recess 85 thereby placing the valve element 43 in the position illustrated in Fig. 2. Concurrently pressure will have risen in the high pressure reservoir 23 to the same value as in the low pressure reservoir so that the stop member 72 will be moved to the position illustrated in Fig. 2 against the compression of the spring 75.

When this occurs, the shifting of the valve element 43 will connect the intake side of the pump 35 with the low pressure reservoir 30 through the conduit 55, passage 54, chamber 67, passage 52 and conduit 53, it being noted that the land 63 of the valve element 43 is now on the left hand side of the annular recess 86 in the valve 40. With the pressure from the low pressure reservoir now present in the chamber 67, the check valve 46 closes and prevents exhaust of pressure from the low pressure reservoir through the atmosphere line 58. Thus the pump 35 will withdraw air from the low pressure reservoir through the passage system just described and discharge it into the high pressure reservoir through the passage system comprising the conduit 56, passage 57, chamber 66, passage 47, check valve chamber 48 and conduit 51, the check valve 49 allowing flow of air under pressure into the high pressure reservoir 23.

The pressure in the space 80 will increase to the same value as the pressure in the high pressure reservoir 23 thereby more positively holding the stop member 72 in the position illustrated in Fig. 2.

Figure 3:
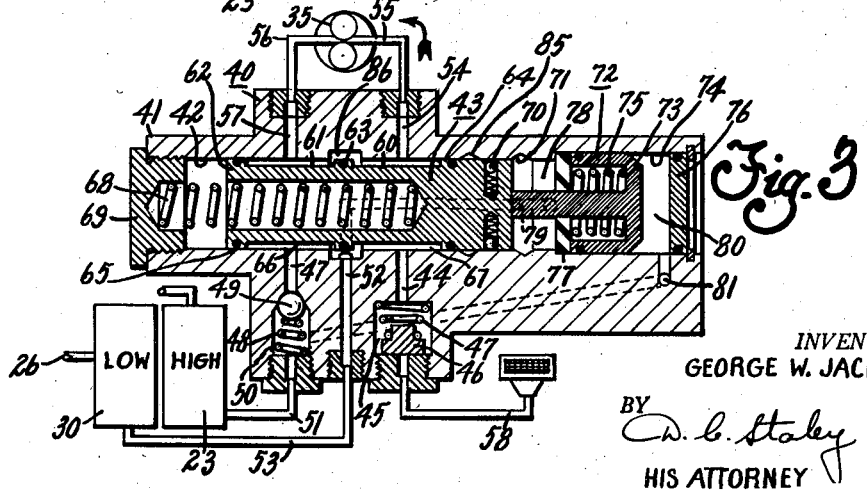
Figure 3 is a view of the control valve in its third position in which the intake side of the pump is connected with the discharge side of the pump to bypass the reservoirs.

As the pump 35 withdraws air from the low pressure reservoir, previously compressed in that reservoir and discharges it into the high pressure reservoir in the manner heretofore described, the pressure in the low pressure reservoir will fall as will the pressure in the space 78 to the right hand side of the valve element 43 until such time as the compression of the spring 68 overcomes the pressure existing in the chamber 78, at which time the valve element 43 will shift from the position illustrated in Fig. 2 to the position illustrated in Fig. 3. Since high pressure from the high pressure reservoir 23 still exists in the space 80 holding the stop 72 in the position illustrated in Fig. 3, the valve element 43 will move in a right hand direction to an intermediate position shown in Fig. 3 wherein the inlet passage 54 of the pump 35 connects with the chamber 67 and the discharge passage 57 from the pump 35 connects with the chamber 66, the chambers 66 and 67 being interconnected at this time through the annular recess 86. The pump thus by-passes the reservoirs and operates under a no load condition, the check valve 49 being closed at this time to prevent high pressure air from the high pressure reservoir exhausting back through the valve member 40.

When air under pressure is used from the high pressure reservoir for supply of air to the air spring 10 to an extent that the pressure in the high pressure reservoir 23 falls to a predetermined low value, the pressure in the chamber 80 will be overcome by the spring 68 to allow the stop 72 to be moved in a right hand direction with the valve member 43 completing its shift in a right hand direction until the detent balls 70 ride in the detent recess 71 with the valve being repositioned as shown in Fig. 1 and thereby reconnect the inlet side of the pump 35 with atmosphere and the discharge side of the pump with the low pressure reservoir. At this time the pressure in the high pressure reservoir 23 can be higher than the pressure in the low pressure reservoir, the check valve 49 preventing inter-communication of the high pressure reservoir with the low pressure reservoir.

In Fig. 4 there is illustrated a dual stage pressure system for supplying air to an air spring and receiving exhaust of air from the air spring of the same general type as that illustrated in Fig. 1. Hence comparable elements will be referred to by the same reference numerals as those of Fig. 1 but with the suffix "a" added. In the arrangement of Fig. 4 the valve element 40 is replaced by two electrically actuated solenoid valves 90 and 95 each of which is adapted to be operated by its own solenoid coil 91 and 96 respectively. The pump 35a has its inlet side 100 connected by the conduit 101 with the valve 90, the valve 90 being connected with the low pressure reservoir 30a. The discharge side 103 of the pump 35a is connected by a conduit 104 with the valve 95 that in turn is connected with the high pressure reservoir 23a by means of a conduit 106 that passes through a check valve 107. The check valve 107 has the ball-check 108 maintained on its seat by the spring 109. The valve 90 has a T-shaped passage 110 that is adapted to be disposed in one position as illustrated in Fig. 4 with the conduit 111 and a second position as illustrated in Fig. 6 wherein the conduit 101 is connected with the conduit 102 and thus with the low pressure reservoir 30a.

The valve 95 also has T-shaped passage 115 that has one position in which the conduit 104 connects with the conduit 106 and thus with the high pressure reservoir 23a and a second position as shown in Fig. 5 in which the conduit 104 connects with a conduit 116 that in turn connects with the conduit 102 for connection of the conduit 104 with the low pressure reservoir 30a.

The solenoid coil 91 is electrically connected through the wire 117 with a contact 118 adapted to be engaged by the switch blade 119 that also engages a contact 120 that connects with a solenoid coil 96 through the wire 121. The switch blade 119 is disposed in the position illustrated in Fig. 4 when the pressure in the low pressure tank is below a predetermined low value, an expansible member 122 being adapted to operate the switch blade in response to the pressure in the low pressure reservoir 30a. Line 123 connects the expansible member 122 with the reservoir 30a.

A second switch member 125 is adapted to close upon a contact 126 to connect the solenoid coil electrically with a source of electric current such as the battery 127, the battery 127 also supplying electric current for the solenoid 91. An expansible member 128 that is connected with the high pressure reservoir 23a through a conduit 129 is adapted to close the switch blade 125 upon the contact 126 when the pressure in the high pressure tank reaches a predetermined value.

An electric switch 130 is provided to deactivate the switches 119 and 125, the switch 130 representing an ignition switch on the vehicle.

The operation of the dual stage compression system illustrated in Fig. 4 is as follows. Assuming the low pressure and high pressure reservoirs 30a and 23a to be at zero pressure, the electric switches 119 and 125 will be in the position illustrated in Figs. 4 and 5. When the switch 130 is closed, the solenoid 96 will be energized to shift the valve 95 from the position illustrated in Fig. 4 to the position illustrated in Fig. 5, the solenoid 91 being de-energized so that the valve 90 does not shift its position at this time. Under this circumstance the intake side 100 of the pump 35a is connected to the atmosphere line 111 while the discharge side 103 of the pump is connected with the low pressure reservoir through the conduit lines 116 and 102.

Air under pressure will be delivered into the low pressure reservoir 30a until the pressure rises to a predetermined value at which the switch 119 will be shifted from the contact 120 to the contact 118 as illustrated in Fig. 6 thereby energizing solenoid 91 and shifting the valve 90 from the position illustrated in Fig. 5 to the position illustrated in Fig. 6. Under this circumstance the inlet side of the pump 35a is connected with the low pressure reservoir 30a through the conduits 101, 102, the discharge side of the pump being connected with the high pressure reservoir 23a through the conduits 104 and 106.

The aforementioned condition will maintain until the pressure in the high pressure reservoir 23a rises sufficiently to close the switch 125 upon the contact 126 thereby energizing the solenoid 96 to shift the valve 95 from the position illustrated in Fig. 6 to the position illustrated in Fig. 7. At this time, since the pressure in the low pressure chamber is still at its maximum predetermined value, the switch 119 maintains engagement with the contact 118 to retain the solenoid 91 energized with the valve 90 being disposed in the same position it attained in Fig. 6. Thus when the pressure rises to a predetermined value in the high pressure reservoir 23a the discharge side of the pump 35a will be connected to the intake side of the pump through the conduits 104, 116, 102 and 101 to bypass the reservoir and permit the pump to operate under a no load condition.

Since air is being used out of the high pressure reservoir 23a by the control valve 20a, and leakage of air occurs in the air suspension system, the pressure in the high pressure reservoir will gradually fall until switch 125 opens. If at this time the pressure in the low pressure reservoir is still at its maximum predetermined value, valve 95 will shift to the position illustrated in Fig. 6 to reestablish connection of the pump 35a with the low pressure reservoir connected to the inlet side of the pump and the discharge side of the pump connected to the high pressure reservoir. However, should the low pressure reservoir be below its maximum predetermined pressure, and the high pressure reservoir also be below its maximum predetermined pressure, the switches 119 and 125 will then attain the position illustrated in Fig. 5 to reposition the valves 90 and 95 so that the pump 35a will again take in air from the atmosphere line 111 and deliver it to the low pressure reservoir 30a, the sequence of operation following as before to build up the pressure first in the low pressure reservoir and thence in the high pressure reservoir.

While the form of embodiment of the invention as herein disclosed constitutes a preferred form, it is to be understood that other forms might be adopted as may come within the scope of the claims which follow.

What is claimed is as follows:

1. In a system for maintaining predetermined minimum and maximum pressure of air supplied to and exhausted from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; a single pump to supply air under pressure to both said reservoirs; said pump being connected with said reservoirs through valve means having one position effecting connection of the intake side of the pump with atmosphere and the discharge side of the pump with the low pressure reservoir, a second position effecting connection of the intake side of the pump with a low pressure reservoir and the discharge side of the pump with the high pressure reservoir and a third position effecting connection of the intake side of the pump with the discharge side of the pump.

2. For an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; means for conserving air that the air suspension system consumes, comprising; a single pump to supply air under pressure to both said reservoirs; said pump being connected with said reservoirs through valve means having one position effecting connection of the intake side of the pump with atmosphere and the discharge side of the pump with the low pressure reservoir, a second position effecting connection of the intake side of the pump with a low pressure reservoir and the discharge side of the pump with the high pressure reservoir and a third position effecting connection of the intake side of the pump with the discharge side of the pump, and check valve means between the high pressure reservoir and the valve means to prevent air flow from the high pressure reservoir to the valve means when said valve means is in its third position.

3. In an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; a single pump to supply air under pressure to both said reservoirs; said pump being connected with said reservoirs through valve means having one position effecting connection of the intake side of the pump with atmosphere and the discharge side of the pump with the low pressure reservoir, said valve means being actuated in response to an increase in pressure in the low pressure reservoir to effect shifting of the valve means to a second position effecting connection of the intake side of the pump with the low pressure reservoir and the discharge side with the high pressure reservoir, said valve means also being actuated in response to an increase in pressure in the high pressure reservoir to a predetermined value above that in the low pressure reservoir to effect shifting of the valve means to a third position effecting connection of the intake side of the pump with the discharge side of the pump.

4. Means for conserving air under pressure supplied to and exhausted from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; comprising, a single pump to supply air under pressure to both said reservoirs; said pump being connected with said reservoirs through valve means having one position effecting connection of the intake side of the pump with atmosphere and the discharge side of the pump with the low pressure reservoir, said valve means being actuated in response to an increase in pressure in the low pressure reservoir to effect shifting of the valve means to a second position effecting connection of the intake side of the pump with the low pressure reservoir and the discharge side with the high pressure reservoir, said valve means also being actuated in response to an increase in pressure in the high pressure reservoir to a predetermined value above that in the low pressure reservoir to effect shifting of the valve means to a third position effecting connection of the intake side of the pump with the discharge side of the pump, said valve means being also actuated in response to a decrease in pressure in the high pressure reservoir to effect shifting of the valve means to reconnect the intake side of the pump with the low pressure reservoir and the discharge side of the pump with the high pressure reservoir.

5. In a dual pressure system for delivery of air to and from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; a single pump to supply air under pressure to both said reservoirs; said pump being connected with said reservoirs through valve means having one position effecting connection of the intake side of the pump with atmosphere and the discharge side of the pump with the low pressure reservoir, said valve means being actuated in response to an increase in pressure in the low pressure reservoir to effect shifting of the valve means to a second position effecting connection of the intake side of the pump with the low pressure reservoir and the discharge side with the high pressure reservoir, said valve means also being actuated in response to an increase in pressure in the high pressure reservoir to a predetermined value above that in the low pressure reservoir to effect shifting of the valve means to a third position effecting connection of the intake side of the pump with the discharge side of the pump, said valve means being also actuated in response to a decrease in pressure in the high pressure reservoir to effect shifting of the valve means to reconnect the intake side of the pump with the low pressure reservoir and the discharge side of the pump with the high pressure reservoir, said valve means also being actuated in response to a decrease in pressure in the low pressure reservoir with the high pressure reservoir also being at low pressure to effect shifting of the valve means to reconnect the intake side of the pump with atmosphere and the discharge side of the pump with the low pressure reservoir.

6. A control system for maintaining dual pressure of air supplied to and exhausted from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; comprising; a single pump to supply air under pressure to both said reservoirs; said pump being connected with said reservoirs through valve means having a chamber provided with passage means connecting the chamber with atmosphere, with the high pressure reservoir and with the low pressure reservoir; and other passage means connecting the chamber with the intake side of the pump and the discharge side thereof; and a shiftable valve member within said chamber having one position effecting connection of the intake side of the pump with the atmosphere and the discharge side of the pump with the low pressure reservoir, a second position effecting connection of the intake side of the pump with the low pressure reservoir and the discharge side with the high pressure reservoir and a third position effecting connection of the intake side of the pump with the discharge side of the pump.

7. A system for maintaining predetermined minimum and maximum pressure of air supplied to and exhausted from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; comprising; a single pump to supply air under pressure to both said reservoirs; said pump being connected with said reservoirs through valve means having a chamber provided with passage means connecting the chamber with atmosphere, with the high pressure reservoir and with the low pressure reservoir; and other passage means connecting the chamber with the intake side of the pump and the discharge side thereof; and a shiftable valve member within said chamber having one position effecting connection of the intake side of the pump with the atmosphere and the discharge side of the pump with the low pressure reservoir, a second position effecting connection of the intake side of the pump with the low pressure reservoir and the discharge side with the high pressure reservoir and a third position effecting connection of the intake side of the pump with the discharge side of the pump, said valve member being actuated in response to an increase in pressure in the low pressure reservoir to shift the same from its first position to its second position, and also being responsive to a decrease in pressure in the low pressure reservoir at the time the valve member is in its second position to shift the valve member from its second position to its third position when the pressure in the low pressure reservoir reaches a predetermined low value.

8. A pressure-controlled supply and exhaust system for conserving air consumed by an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; comprising; a single pump to supply air under pressure to both said reservoirs; said pump being connected with said reservoirs through valve means having a chamber provided with passage means connecting the chamber with atmosphere, with the high pressure reservoir and with the low pressure reservoir; and other passage means connecting the chamber with the intake side of the pump and the discharge side thereof; and a shiftable valve member within said chamber having one position effecting connection of the intake side of the pump with the atmosphere and the discharge side of the pump with the low pressure reservoir, a second position effecting connection of the intake side of the pump with the low pressure reservoir and the discharge side with the high pressure reservoir and a third position effecting connection of the intake side of the pump with the discharge side of the pump, and a movable stop member in said valve means actuated by pressure from said high pressure reservoir and engageable with said valve member to provide for positioning of the same in said third position, said stop member being responsive to pressure in said high pressure reservoir and having one position when said high pressure reservoir is at low pressure to permit said valve member to position itself in its said first position and a second position when said high pressure reservoir is at high pressure to effect positioning of said valve member in its said third position when moving from its second position toward its first position.

9. Means for maintaining a predetermined minimum and maximum pressure of air and for conserving air required by an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; a single pump to supply air under pressure to both said reservoirs; said pump being connected with said reservoirs through two independently electrically operated valve means one of which is in a conduit line connecting the intake of said pump with said low pressure reservoir and the second of which is in a conduit line connecting the discharge side of said pump with said high pressure reservoir, said first valve having one position connecting the intake side of said pump with atmosphere and a second position with said low pressure reservoir, said second valve having one position connecting the discharge side of said pump with said high pressure reservoir and a second position connecting the discharge side of said pump with said conduit connecting the intake side of the said pump with said low pressure reservoir, said valves being positionable cooperatively to first connect the intake side of said pump with atmosphere and the discharge side of said pump with said low pressure reservoir, secondly to connect the intake side of said pump with the said low pressure reservoir and the discharge side of the pump with said high pressure reservoir, and thirdly to connect the intake side of said pump with the discharge side of said pump.

10. A control system for governing delivery of air to and from high and low pressure reservoirs in an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; comprising; a single pump to supply air under pressure to both said reservoirs; said pump being connected with said reservoirs through two independently electrically operated valve means one of which is in a conduit line connecting the intake of said pump with said low pressure reservoir and the second of which is in a conduit line connecting the discharge side of said pump with said high pressure reservoir, said first valve having one position connecting the intake side of said pump with atmosphere and a second position with said low pressure reservoir, said second valve having one position connecting the discharge side of said pump with said high pressure reservoir and a second position connecting the discharge side of said pump with said conduit connecting the intake side of the said pump with said low pressure reservoir, said valves being positionable cooperatively to first connect the intake side of said pump with atmosphere and the discharge side of said pump with said low pressure reservoir, secondly to connect the intake side of said pump with the said low pressure reservoir and the discharge side of the pump with said high pressure reservoir, and thirdly to connect the intake side of said pump with the discharge side of said pump, switch means actuated in response to an increase of pressure in said low pressure reservoir to effect operation of said valve means to shift them from their first cooperative position to their second cooperative position, and additional switch means responsive to pressure in said high pressure reservoir to shift said valve means from their second cooperative position to their third cooperative position.

11. In a dual pressure system for delivery of air to and from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; a single pump to supply air under pressure to both said reservoirs; said pump being connected with said reservoirs through two independently electrically operated valve means one of which is in a conduit line connecting the intake of said pump with said low pressure reservoir and the second of which is in a conduit line connecting the discharge side of said pump with said high pressure reservoir, said first valve having one position connecting the intake side of said pump with atmosphere and a second position with said low pressure reservoir, said second valve having one position connecting the discharge side of said pump with said high pressure reservoir and a second position connecting the discharge side of said pump with said conduit connecting the intake side of the said pump with said low pressure reservoir, said valves being positionable cooperatively to first connect the intake side of said pump with atmosphere and the discharge side of said pump with said low pressure reservoir, secondly to connect the intake side of said pump with the said low pressure reservoir and the discharge side of the pump with said high pressure reservoir, and thirdly to connect the intake side of said pump with the discharge side of said pump, switch means actuated in response to an increase of pressure in said low pressure reservoir to effect operation of said valve means to shift them from their first cooperative position to their second cooperative position, additional switch means responsive to pressure in said high pressure reservoir to shift said valve means from their second cooperative position to their third cooperative position, and other switch means electrically in series with the aforementioned switch means to deactivate them.

12. A system for maintaining predetermined minimum and maximum pressure of air supplied to and exhausted from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; comprising; a single pump to supply air under pressure to both said reservoirs; said pump being connected with said reservoirs through two independently electrically operated valve means one of which is in a conduit line connecting the intake of said pump with said low pressure reservoir and the second of which is in a conduit line connecting the discharge side of said pump with said high pressure reservoir, said first valve having one position connecting the intake side of said pump with atmosphere and a second position with said low pressure reservoir, said second valve having one position connecting the discharge side of said pump with said high pressure reservoir and a second position connecting the discharge side of said pump with said conduit connecting the intake side of the said pump with said low pressure reservoir, switch means having one position to effect energization of said second valve to effect positioning of the said valve in its said second position with said first valve being deenergized to effect positioning of the first valve in its first position whereby to provide for intake of air into said pump from atmosphere and discharge compressed air into said low pressure reservoir, said switch means having a second position to effect energization of said first valve to effect positioning of the said valve in its second position and deenergize said second valve to effect positioning of the same in its first position whereby to provide for intake of air from the low pressure reservoir and discharge of air under pressure into the high pressure reservoir, and additional switch means responsive to pressure in said high pressure reservoir to effect energization of said second valve to position it in its first position concurrently with energization of said first valve by said first switch to position it in its second position whereby to provide for connection of the intake side of said pump with the discharge side thereof.

13. A pressure-controlled supply and exhaust system for conserving air consumed by an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air from the air spring in response to clearance height changes to effect correction of such changes with air being supplied to the control valve from a high pressure reservoir and exhausted from the valve to a low pressure reservoir; a single pump to supply air under pressure to both said reservoirs; said pump being connected with said reservoirs through two independently electrically operated valve means one of which is in a conduit line connecting the intake of said pump with said low pressure reservoir and the second of which is in a conduit line connecting the discharge side of said pump with said high pressure reservoir, said first valve having one position connecting the intake side of said pump with atmosphere and a second position with said low pressure reservoir, said second valve having one position connecting the discharge side of said pump with said high pressure reservoir and a second position connecting the discharge side of said pump with said conduit connecting the intake side of the said pump with said low pressure reservoir, switch means having one position to effect energization of said second valve to effect positioning of the said valve in its said second position with said first valve being deenergized to effect positioning of the first valve in its first position whereby to provide for intake of air into said pump from atmosphere and discharge compressed air into said low pressure reservoir, said switch means having a second position to effect energization of said first valve to effect positioning of the said valve in its second position and deenergize said second valve to effect positioning of the same in its first position whereby to provide for intake of air from the low pressure reservoir and discharge of air under pressure into the high pressure reservoir, and additional switch means responsive to pressure in said high pressure reservoir to effect energization of said second valve to position it in its first position concurrently with energization of said first valve by said first switch to position it in its second position whereby to provide for connection of the intake side of said pump with the discharge side thereof, and a third switch means electrically in series with the two aforementioned switch means to deactivate the same.

14. A dual pressure system for conserving air under pressure for supply to and exhaust from an air suspension system for a motor vehicle having an air spring supporting a sprung mass upon an unsprung mass and including a control valve responsive to clearance height changes between the sprung mass and the unsprung mass to effect supply of air under pressure to the air spring or exhaust of air under pressure from the air spring in response to clearance height changes to effect correction of such changes with air being supplied to and exhausted from the air spring through the control valve, comprising, a high pressure reservoir supplying air under one pressure to the air spring through the control valve, a low pressure reservoir containing air under another pressure and receiving air exhausted from the air spring, a single pump means connected with said reservoirs to supply air under pressure to both reservoirs, and means including a first valve for connecting between said reservoirs and said pump means, said first valve having one position effecting connection of the intake side of said pump means with atmosphere and the discharge side of said pump means with said low pressure reservoir, having a second position effecting connection of the intake side of said pump means with said low pressure reservoir to which air from the air springs is discharged in exhaust of air from the air springs and effecting connection of the discharge side of said pump means with said high pressure reservoir, and having a third position effecting connection of the intake side of said pump means with the discharge side of said pump means for unloading of said pump means, said latter means including valving means in addition to said first valve, said additional valving means including check valves at the inlet to said high pressure reservoir and at the intake side of said pump means connectible with atmosphere, said first valve governing maintenance of one pressure in said low pressure reservoir and also maintenance of the other pressure in said high pressure reservoir.

References Cited in the file of this patent

UNITED STATES PATENTS 1,105,805    Liebowitz  ---------------  Aug. 4, 1914